US010027683B2

(12) United States Patent
Bruce et al.

(10) Patent No.: US 10,027,683 B2
(45) Date of Patent: Jul. 17, 2018

(54) SHARED SYMMETRIC KEY ENCRYPTION

(71) Applicant: Hewlett-Packard Development Company, L.P., Houston, TX (US)

(72) Inventors: Spencer Bruce, Yehud (IL); Boris Kozorovitzky, Yehud (IL); Doron Levi, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 133 days.

(21) Appl. No.: 14/811,673

(22) Filed: Jul. 28, 2015

(65) Prior Publication Data

US 2017/0063810 A1    Mar. 2, 2017

(51) Int. Cl.
*H04L 9/32* (2006.01)
*H04L 29/06* (2006.01)
*H04L 9/08* (2006.01)
*G06F 21/62* (2013.01)

(52) U.S. Cl.
CPC .......... *H04L 63/126* (2013.01); *H04L 63/045* (2013.01); *G06F 21/6209* (2013.01); *H04L 9/0816* (2013.01); *H04L 9/0822* (2013.01); *H04L 9/0825* (2013.01); *H04L 9/3297* (2013.01); *H04L 2463/062* (2013.01)

(58) Field of Classification Search
CPC ............... H04L 63/0435; H04L 63/061; H04L 63/0876; H04L 63/123; H04L 63/0478; H04L 63/126; H04L 63/045; H04L 9/0816; H04L 9/3297; H04L 9/0825; H04L 9/6209; H04L 9/0822; H04L 9/0866; H04L 9/0838; H04L 2463/062; G06F 21/6209

USPC ................................. 713/171, 156, 159, 168
See application file for complete search history.

(56) References Cited

U.S. PATENT DOCUMENTS

| | | | |
|---|---|---|---|
| 6,189,146 B1 | 2/2001 | Misra et al. | |
| 6,219,652 B1 | 4/2001 | Carter et al. | |
| 8,205,096 B2 | 6/2012 | Cheng | |
| 8,522,042 B2 | 8/2013 | Barron et al. | |
| 8,646,091 B2 | 2/2014 | O'Connor et al. | |
| 8,732,841 B2 | 5/2014 | Ronning et al. | |
| 2002/0107811 A1* | 8/2002 | Jain ...................... | G06Q 10/107 705/64 |
| 2002/0108050 A1* | 8/2002 | Raley ...................... | G06F 21/10 713/193 |
| 2002/0183985 A1* | 12/2002 | Hori ........................ | G06F 21/10 703/1 |
| 2007/0100762 A1 | 5/2007 | Luo et al. | |
| 2008/0140578 A1 | 6/2008 | Felt et al. | |

(Continued)

OTHER PUBLICATIONS

Meyer, B., ".NET licensing: How to use the licenses.licx file?," TX Text Control Blog, Available Online at http://www.textcontrol.com/en_US/blog/archive/20091015/, Oct. 15, 2009, 6 pages.

*Primary Examiner* — Daniel Potratz
*Assistant Examiner* — William B Jones

(57) ABSTRACT

A method for encrypting a message is described in which a public key and a private key are generated. The public key is encrypted using a shared symmetric key shared with an agent. The private key is encrypted using a private symmetric key. The encrypted public key is sent to the agent and decrypted by the agent with the shared symmetric key. A message encrypted with the shared symmetric key is received from the agent, and is decrypted using the shared symmetric key.

16 Claims, 10 Drawing Sheets

(56) References Cited

U.S. PATENT DOCUMENTS

| | | | |
|---|---|---|---|
| 2009/0132813 A1* | 5/2009 | Schibuk | G06Q 20/223 |
| | | | 713/158 |
| 2010/0088236 A1* | 4/2010 | Karabulut | G06F 21/10 |
| | | | 705/59 |
| 2012/0159178 A1* | 6/2012 | Lin | H04L 9/3247 |
| | | | 713/178 |
| 2013/0031642 A1 | 1/2013 | Dwivedi et al. | |
| 2015/0181422 A1* | 6/2015 | Rombouts | H04L 9/3271 |
| | | | 380/270 |

* cited by examiner

MACHINE-READABLE STORAGE MEDIUM 600

MACHINE-INDEPENDENT OPERATION INSTRUCTIONS WRITTEN IN SCRIPTING PROGRAMMING LANGUAGE 604

MACHINE-SPECIFIC PUBLIC KEY DECRYPTING INSTRUCTIONS COMPRISING A SHARED SYMMETRIC KEY SHARED WITH A SERVER, THE MACHINE-SPECIFIC PUBLIC KEY DECRYPTING INSTRUCTIONS TO DECRYPT AN ENCRYPTED PUBLIC KEY RECEIVED FROM THE SERVER 608

MACHINE-SPECIFIC REQUEST CREATION INSTRUCTIONS TO CREATE A REQUEST COMPRISING A REQUEST TIMESTAMP 612

REQUEST COMPRISES A REQUEST IDENTIFICATION 616

MACHINE-SPECIFIC LICENSE RECEIVING INSTRUCTIONS TO RECEIVE A LICENSE SENT IN RESPONSE TO THE REQUEST, THE LICENSE ENCRYPTED BY A PRIVATE KEY THAT FORMS ASYMMETRIC KEY PAIR WITH PUBLIC KEY AND COMPRISING A RESPONSE TIMESTAMP 620

MACHINE-SPECIFIC VERIFICATION INSTRUCTIONS TO DETERMINE WHETHER A RESPONSE TIMEFRAME BETWEEN THE REQUEST TIMESTAMP AND THE RESPONSE TIMESTAMP IS LESS THAN A PREDETERMINED TIMEFRAME 624

MACHINE-SPECIFIC AUTHORIZATION INSTRUCTIONS TO AUTHORIZE EXECUTION OF THE MACHINE-INDEPENDENT OPERATION INSTRUCTIONS TO PERFORM THE OPERATION IF THE RESPONSE TIMEFRAME IS LESS THAN THE PREDETERMINED TIMEFRAME 628

FIG. 6A

```
┌─────────────────────────────────────────────────────────────────┐
│               MACHINE-READABLE STORAGE MEDIUM 600               │
│                                                                 │
│  ┌───────────────────────────────────────────────────────────┐  │
│  │ MACHINE-SPECIFIC NOTIFICATION INSTRUCTIONS TO SEND TO     │  │
│  │ SERVER A MESSAGE CONFIRMING COMPLETION OF THE OPERATION   │  │
│  │ WHEN THE MACHINE-INDEPENDENT OPERATION INSTRUCTIONS       │  │
│  │ COMPLETE PERFORMANCE OF THE OPERATION  632                │  │
│  └───────────────────────────────────────────────────────────┘  │
│                                                                 │
│  ┌───────────────────────────────────────────────────────────┐  │
│  │ MACHINE-SPECIFIC STATUS CONFIRMATION INSTRUCTIONS TO SEND │  │
│  │ STATUS MESSAGE ENCRYPTED BY THE PUBLIC KEY TO SERVER      │  │
│  │ DURING PERFORMANCE OF OPERATION; AND IF AN ACKNOWLEDGMENT │  │
│  │ MESSAGE RESPONSIVE TO ENCRYPTED STATUS MESSAGE IS NOT     │  │
│  │ RECEIVED FROM SERVER WITHIN ACKNOWLEDGEMENT TIMEFRAME,    │  │
│  │ CEASE PERFORMANCE OF OPERATION  636                       │  │
│  └───────────────────────────────────────────────────────────┘  │
│                                                                 │
│  ┌───────────────────────────────────────────────────────────┐  │
│  │ WHEREIN REQUEST COMPRISES REQUEST IDENTIFICATION,         │  │
│  │ MACHINE-SPECIFIC REQUEST STORAGE INSTRUCTIONS TO STORE    │  │
│  │ REQUEST IDENTIFICATION IN A STORAGE  640                  │  │
│  └───────────────────────────────────────────────────────────┘  │
│                                                                 │
│  ┌───────────────────────────────────────────────────────────┐  │
│  │ MACHINE-SPECIFIC IDENTIFICATION INSTRUCTIONS TO COMPARE A │  │
│  │ LICENSE REQUEST IDENTIFICATION IN THE LICENSE RECEIVED    │  │
│  │ FROM SERVER TO THE STORED REQUEST IDENTIFICATION; AND IF  │  │
│  │ THE LICENSE REQUEST IDENTIFICATION DOES NOT MATCH THE     │  │
│  │ STORED REQUEST IDENTIFICATION, PREVENT PERFORMANCE OF THE │  │
│  │ OPERATION  644                                            │  │
│  └───────────────────────────────────────────────────────────┘  │
│                                                                 │
└─────────────────────────────────────────────────────────────────┘
```

FIG. 6B

SHARED SYMMETRIC KEY ENCRYPTION

BACKGROUND

Applications installed on a client machine may include license enforcement code that restricts the application's functionality based on the user possessing a valid license. Applications written in a scripted language, such as JavaScript or other language that may be reverse-engineered, may be subject to hacking and license circumvention attempts. For example, license enforcement code written in a scripted language may be circumvented by an attacker, such as by commenting out or changing the code.

BRIEF DESCRIPTION OF THE DRAWINGS

FIGS. 6A and 6B are a block diagram of a non-transitory machine-readable storage medium containing instructions according to another example of the present disclosure.

DETAILED DESCRIPTION

Figure 1:
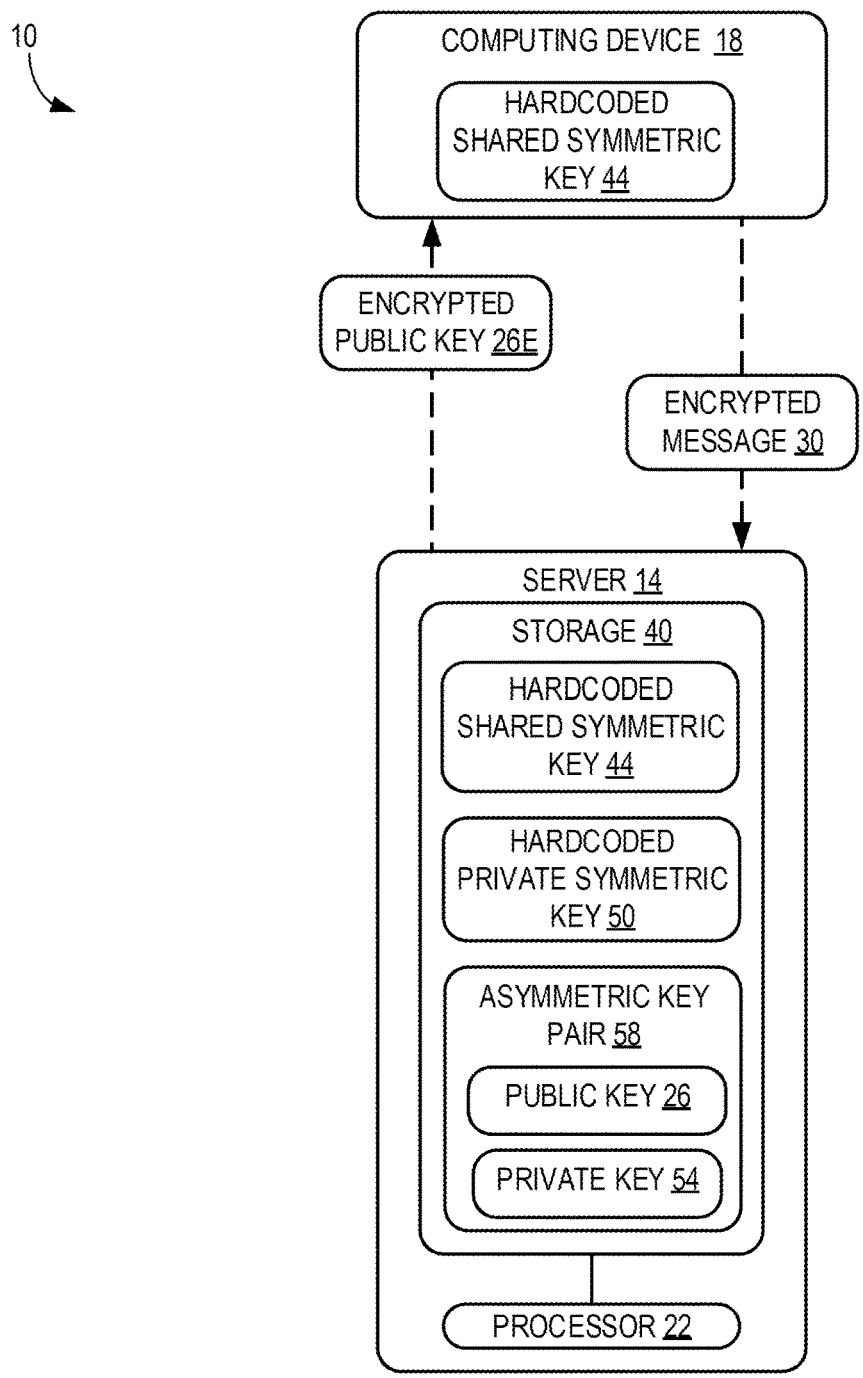
FIG. 1 is a block diagram of a system for encrypted communication between a server and computing device according to an example of the present disclosure.

Applications and other software may be subject to a license that restricts the use, redistribution, modification, and/or other rights related to the software. In some examples, license enforcement mechanisms may be utilized to enforce the license. For example, a product activation license may utilize an application comprising a hash function that generates a unique installation ID. Such installation ID may be generated by mapping a hardware serial number and a product ID/key number specific to the product's license. In some examples the hash function may be hidden from the user within compiled binary code. This installation ID may be sent to a license server to validate the authenticity of the product key, and to ensure that the product key is not being used for multiple installations. Other examples of license restrictions may include disabling an application upon expiration of a trial period, selectively enabling and disabling particular functionality, and controlling the number of users who are authorized to use the application during a time period.

In some examples, applications may be written either entirely or partially in machine-independent instructions, such as code in the form of an intermediate representation that may be run on different machines using a special interpreter/runtime. Examples of such machine-independent instructions include scripting languages, such as JavaScript, Groovy or Python, and certain compiled code, such as C# and Java, that runs in a runtime environment. In some examples, a web browser may download a licensed script from a server and run it locally on a client computing device. Enforcement of the license may be carried out on the server through server-side logic. In some cases, where a licensed application is distributed "non-natively" in machine-independent instructions, license enforcement portions of the code may be circumvented by commenting out or changing the code. In other examples where the license enforcement code is compiled, such as in Java or C#, the code still may be reverse-engineered and circumvented.

Other license vulnerabilities may arise from communications between a client application and a server. For example, where license key validity is checked via communication between a client and a server, a non-proprietary protocol such as HTTP or even secured HTTPS may be used. In some examples, even where the license validity/enforcement code in both client and server is written in native, compiled code and communications are encrypted, an attacker may intercept communications and either decrypt them using a private key or carry out "replay" attacks. For example, an attacker may initially create a situation in which a requested operation is permitted according to the license, record this interaction using a sniffer, and later replay the message to thereby bypass the license protection.

In distributed systems, such as microservices or service orientated architectures, applications may be distributed among different processes on the same computing device or different computing devices. One service may comprise instructions that, when executed by a processor (e.g., a processor associated with a license server) check and validate the particular application functionality that is available to the user. Other services and corresponding applications may comprise instructions that, when executed by a processor, contact the license server for license validation before carrying out a particular operation. In some examples the license server may be configured to restrict a user to certain functionality, such as only one application operation per day. In some examples where at least one of the license service and the client application is written in machine-independent code, this license validation process may be compromised and an attacker may access functionality to which he or she is not entitled.

In some examples, applications may be released under a permissive, open source license such as an MIT license. In such case, the code is released and run from source without compilation, and thus a user may easily change it to suit the user's needs. Enforcement of licensing restrictions may be challenging in these examples. In other examples, such as in a high-security environment, network security systems may prevent a licensed client-side application from contacting a license server located on another network located beyond a firewall.

The present disclosure describes examples of a server, method and non-transitory machine-readable storage media that may be utilized for encrypted communications. In one example and with reference to FIG. 1, a block diagram of a system 10 for facilitating encrypted communication between a server 14 and a computing device 18 is provided. As described in more detail below, the server 14 may include a processor 22 that executes instructions for providing an encrypted public key 26E to the computing device 18 and receiving encrypted messages 30 from the computing device. In some examples the processor 22 may comprise a plurality of processors.

The processor 22 may include at least one physical device configured to execute at least one instruction. For example, the processor 22 may be configured to execute instructions that are stored on a non-transitory machine-readable storage medium. Such instructions may be part of at least one application, agent, service, program, routine, library, object, component, data structure, or other logical construct. Such instructions may be implemented to perform methods and functions described herein, or to perform a task, implement a data type, transform the state of at least one device, or otherwise arrive at a desired result.

Storage 40 may store instructions executable by the processor 22. As described in more detail below, in some examples storage 40 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 40 may include memory devices with at least one of the following characteristics: volatile, non-volatile, dynamic, static, read/write, read-only, random access, sequential access, location addressable, file addressable, and content addressable.

In some examples, the processor 22 and storage 40 may be components of at least one computing device, such as server 14. In other examples, such computing device may take the form of a network computing device, desktop computing device, and/or other suitable type of computing device.

The storage 40 may comprise a hardcoded shared symmetric key 44 that may be used to encrypt the encrypted public key 26E. The storage 40 also may comprise a hardcoded private symmetric key 50 that may be used to encrypt a private key 54 of an asymmetric key pair 58 that includes the public key 26. In some examples, the shared symmetric key 44 and/or private symmetric key 50 may have a length of 32-bits, 64-bits, or any other suitable length. In some examples and as described in more detail below, the asymmetric key pair 58 may be used to provide one encryption level of a two-level encryption process for validating a license request message and providing a corresponding license to the computing device 18.

The computing device 18 also comprises a storage that includes the shared symmetric key 44. In some examples the shared symmetric key 44 may be hardcoded in an application or agent stored in the computing device 18. In one example, the processor 22 of server 14 may execute instructions to generate the asymmetric key pair 58. The private key 54 of the asymmetric key pair 58 may be encrypted using the hardcoded private symmetric key 50. The public key 26 of the asymmetric key pair 58 may be encrypted using the hardcoded shared symmetric key 44. The encrypted public key 26E may be sent to computing device 18 and may be decrypted by the computing device 18 using the shared symmetric key 44 that is hardcoded in the computing device 18. The server 14 may receive from the computing device 18 an encrypted message 30 encrypted with the shared symmetric key 44, and may decrypt the message using the shared symmetric key.

Figure 2:
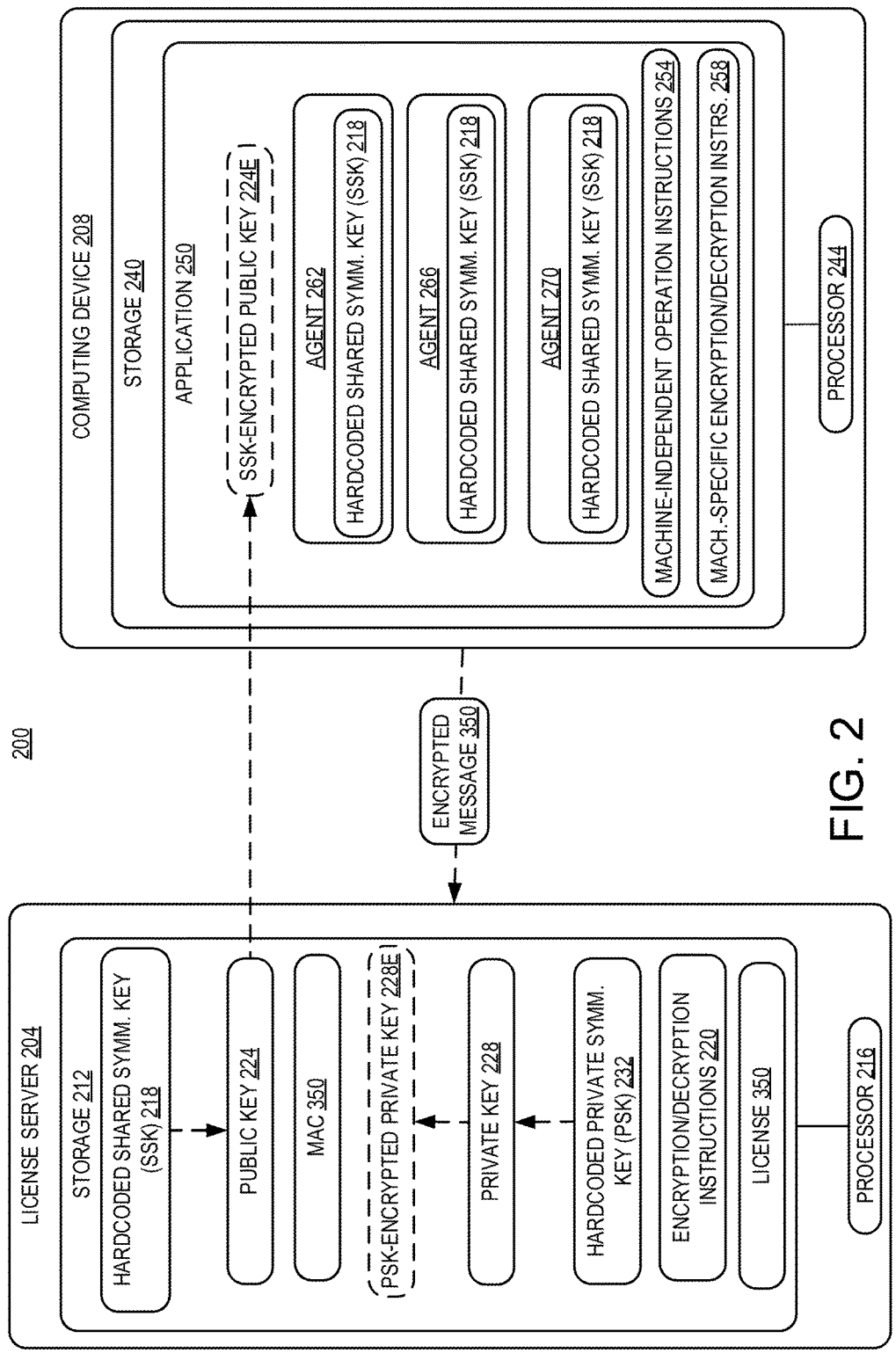
FIG. 2 is a block diagram illustrating an example of encrypted communication between a license server and an agent according to an example of the present disclosure.
Figure 3:
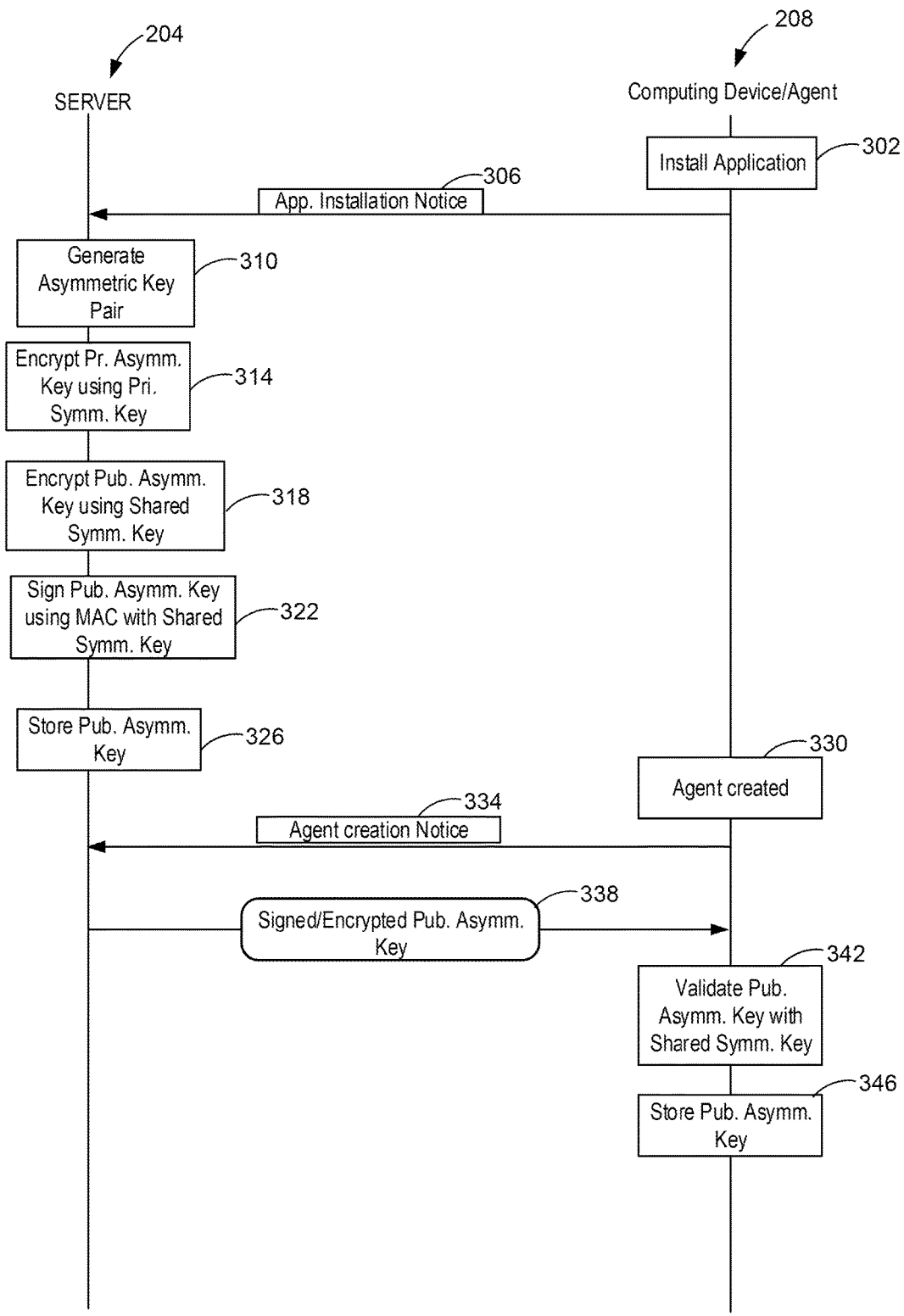
FIG. 3 is a diagram illustrating an example flow of communications between a license server and an agent on a computing device according to an example of the present disclosure.

Turning now to FIGS. 2, 3 and 4, example use cases of encrypted communications according to the present disclosure are provided. FIG. 2 is a block diagram illustrating a system 200 comprising a license server 204 communicatively coupled to a computing device 208 according to an example of the present disclosure. In some examples the license server 204 may be communicatively coupled and exchange encrypted communications with a plurality of computing devices. The license server 204 comprises a storage 212 coupled to a processor 216, with the storage comprising a hardcoded shared symmetric key (SSK) 218. As described in more detail below, encryption/decryption instructions 220 in storage 212 may be executed by processor 216 to generate an asymmetric key pair comprising a public key 224 and a private key 228. The encryption/decryption instructions 220 also may be executed to encrypt the private key 228 of the asymmetric key pair with a hardcoded private symmetric key (PSK) 232 to generate a PSK-encrypted private key 228E.

The computing device 208 comprises a storage 240 coupled to a processor 244, with the storage also comprising an application 250. In some examples, the application 250 may be a hybrid application that comprises a combination of machine-independent (non-native) code and machine-specific (native) code. In some examples, the machine-independent code may comprise machine-independent operation instructions 254 written in a scripting language, such as JavaScript, Groovy or Python. The operation instructions 254 may be executed to perform a variety of functions. In one example and as described in more detail below, the operation instructions 254 may be executed to spawn agents, such as agents 262, 266 and 270, that may emulate virtual users to apply workloads to another application in a load-testing environment. In some examples, the agents may comprise machine-independent instructions of the operation instructions 254. In some examples, use of the application 250 and agents may be subject to a license with the manufacturer/distributor of the application.

The storage 240 further comprises the shared symmetric key (SSK) 218 hardcoded in the computing device 208. In some examples the SSK 218 may be hardcoded in the agents that carry out operations as described herein. As described in more detail below, encryption/decryption instructions 258 in storage 240 may be executed to decrypt the SSK-encrypted public key 224E received from the license server 204, and to utilize the decrypted public key 224 to decrypt other encrypted messages and licenses received from the license server. Further, the encryption/decryption instructions 258 may take the form of machine-specific instructions within the computing device 208. In some examples the machine-specific encryption/decryption instructions 258 may be written in C, C++ or other suitable programming language. In this manner, while the operation instructions 254 and components of the agents may be machine-independent code that is freely accessible and subject to modification, the machine-specific encryption/decryption instructions 258 and hardcoded SSK 218 may be secured from access or tampering.

As described in more detail below, this configuration may be utilized to securely administer and maintain the license-protected use of the application 250. For example and as illustrated in the examples herein, operational portions of the application may be conveniently written in a non-compiled scripting language, while extensions to the application, such as agents, and encryption/decryption instructions that implement and enforce a licensing mechanism may be written in a machine-specific native language, such as C++. Accordingly, such a configuration enables developers to write operational portions of applications in machine-independent code, which may be easily altered, while maintaining a secure licensing mechanism by utilizing extensions and encryption/decryption code written in machine-specific code. In some examples, communications between machine-independent code and machine-specific code may be done in memory and supported by JavaScript or other scripted language.

Turning to FIG. 3, a diagram illustrating an example flow of communications between license server 204 and an agent 262 that is launched via application 250 on computing device 208 is provided. In this example, both the encryption/decryption instructions 220 on license server 204 and encryption/decryption instructions 258 on computing device 208 are machine-specific compiled code, such as C++. In other examples any suitable machine-specific programming language may be utilized. The machine-independent operation instructions 254 may be written in JavaScript, other scripted language or other compiled language that runs in a runtime environment.

In one example, the application 250 may perform load-testing of an enterprise or other application to evaluate performance, scalability or other aspects of the application. In this example, the application 250 may spawn agents that emulate hundreds or thousands of concurrent virtual users to apply workloads to the application under test. Each agent may be configured to emulate a particular number of virtual users, and may be separately licensed for use. For example, where an agent may emulate up to 10,000 virtual users and a customer desires to test loads up to 50,000 virtual users, the customer may purchase a license for 5 agents or 50,000 virtual users. In other examples an agent may emulate fewer or more virtual users. With reference to FIG. 2, three agents 262, 266 and 270 are illustrated, while in other examples fewer or more agents may be created.

As shown in the diagram of FIG. 3, in one example and at 302 the application 250 may be installed on the computing device. At 306 an application installation notice may be sent to the license server 204. At 310 and in response to receiving the application installation notice 306, the license server 204 may generate an asymmetric key pair consisting of the public key 224 and private key 228. At 314 the license server 204 encrypts the private asymmetric key 228 using the hardcoded private symmetric key 232. In this example, the hardcoded private symmetric key 232 is known only to the license server 204, and is not shared or otherwise made available except as hardcoded in the license server. In this manner, the security of the private symmetric key 232 and its use in communications with the computing device 208 as described herein may be enhanced.

At 318 the license server 204 encrypts the asymmetric public key 224 using the hardcoded shared symmetric key (SSK) 218. At 322 the license server may sign the encrypted public key 224E using a message authentication code (MAC) with the SSK 218. At 326 the license server may store the signed, encrypted public asymmetric key 224E. At 330 and in response to programmatic or user input, the computing device 208 via application 250 may create an agent 262. At 334 the computing device 208 may send an agent creation notice to the license server 204 to alert the server that an agent has been created. At 338 and in response to receiving the agent creation notice, the license server 204 may send the signed, encrypted public asymmetric key 224E to the computing device 208. In response, at 342 the agent may validate the MAC signature of the encrypted public asymmetric key 224E using the shared symmetric key 218 hardcoded in the application 250. At 346 the agent 262 may store the encrypted public asymmetric key 224E at the computing device for later use.

With the above configuration, both the public asymmetric key 224 and the private asymmetric key 228 are encrypted with secret symmetric keys. More particularly, the private asymmetric key 228 is encrypted with the private symmetric key (PSK) 232 that is hardcoded and known only to the license server 204. The public asymmetric key 224 is encrypted with the shared symmetric key (SSK) 218 that is hardcoded in both the license server 204 and the application 250 on the computing device 208. In this manner, the present configuration presents significant challenges to a potential attacker attempting to fabricate messages between an agent and the license server 204.

In some examples, the public key 224 and private key 228 of the asymmetric key pair are generated upon a first installation of the application 250 on a computing device. For subsequent installations of the application 250, a new asymmetric key pair comprising a new public key and new private key may be generated for each installation. In this manner, using a unique asymmetric key pair for each installation may prevent a user from sharing their asymmetric key pair with others for potential circumvention of the licensing restrictions.

Figure 4A:
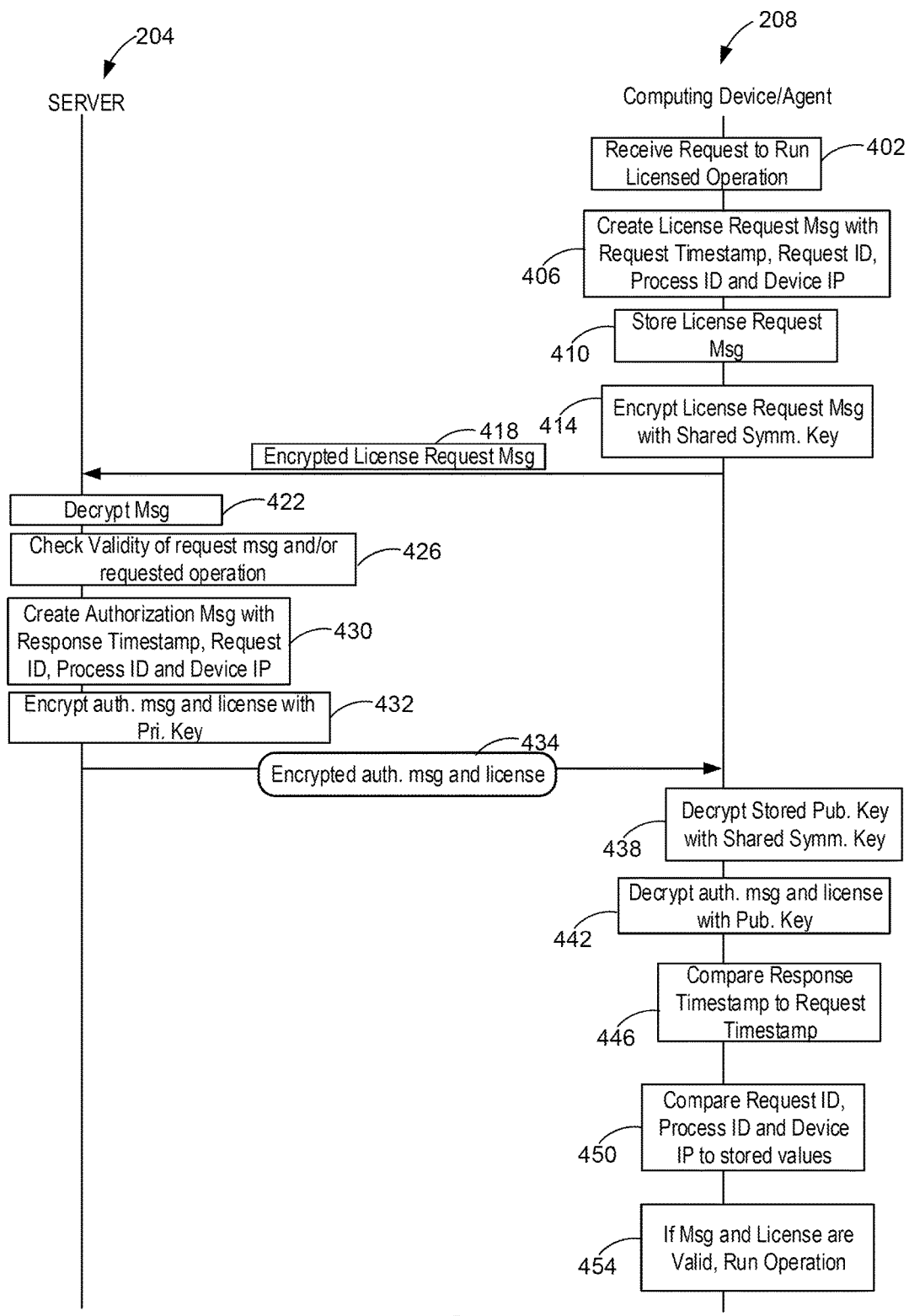
FIGS. 4A and 4B are diagrams illustrating example flows of communications between a license server and an agent on a computing device according to an example of the present disclosure.

With reference now to FIG. 4A, in one example and at 402 the computing device 208 may receive a request to run a licensed operation using at least one agent, such as agent 262. At 406 the agent 262 may create a license request message that requests authorization to run the licensed operation. In some examples, the license request message may include at least one additional identifier that identifies the unique instantiation of the agent associated with the license request message. In some examples, such identifier may comprise a unique agent process ID, a request ID, a computing device IP address, and a request timestamp indicating when the message was created. The unique agent process ID may be created by the application 250 or operating system of computing device 208 when a particular instance of an agent is created or spun up. A request ID may comprise a unique identifier associated with each new request. The message timestamp may be a timestamp created at the creation of the message.

At 410 the agent 262 may store the license request message or portions of the message in local memory of the computing device 208. At 414 the agent 262 encrypts the license request message with the shared symmetric key 218. At 418 the agent sends the encrypted license request message to the license server 204. At 422 the license server decrypts the encrypted license request message with its copy of the shared symmetric key 218. At 426 the license server 204 may check the validity of the request message and/or requested operation. For example, the license server 204 may analyze the request ID to determine whether the agent 262 is licensed to run the requested operation. Where the agent 262 is not properly licensed, the license server 204 rejects the request. Where the agent 262 is properly licensed, at 430 the license server may create an authorization message including a license that authorizes the agent to run the requested operation. In some examples, the authorization message may include a response timestamp, the request ID, the process ID and the host ID. After decrypting the private key 228 with the hardcoded private symmetric key 232, at 432 the license server 204 may encrypt the authorization message and license with the private key. At 434 the license server 204 sends the encrypted authorization message and license to the computing device 208.

At 438 the agent 262 decrypts the encrypted public key 224E stored on computing device 208 using the shared symmetric key 218. At 442 the agent 262 uses the decrypted public key 224 to decrypt the authorization message and license. As noted above, in some examples an attacker may intercept communications between the computing device 208 and license server 204, and may attempt to carry out a replay attack. For example, an attacker may initially create a situation in which a requested operation is permitted according to the license, record this interaction using a sniffer, and then replay the message and thus bypass the license protection.

To address this potential vulnerability, at 446 and in some examples, the agent 262 may compare the response timestamp in the authorization message to the request timestamp stored in the computing device 208. Where a time gap between the response timestamp and the request timestamp is less than or equal to a predetermined timeframe, the agent 262 may determine that the authorization message is valid and not an attempted replay attack. Where the time gap between the response timestamp and the request timestamp is greater than the predetermined timeframe, the agent 262 may reject the response message as a potential replay attack. The predetermined timeframe may be programmatically determined by the application 250 or license server 204, may be configured by a developer or licensor of the application 250, or configured by a user of the computing device 208. In some examples, the predetermined timeframe may be 30 seconds, 1 minute, 2 minutes, 3 minutes, or any other suitable timeframe.

In some examples and in addition to or instead of comparing the request and response timestamps, at 450 the agent 262 may compare at least one of the request ID, process ID and device IP in the response message with the corresponding data stored in the computing device 208. If any of the request ID, process ID or device IP in the response message do not match the corresponding data in the request message, then the agent 262 may reject the response message as a potentially corrupted message. At 454, where the agent 262 determines that the authorization message and license are valid, the agent runs the requested operation.

Figure 4B:
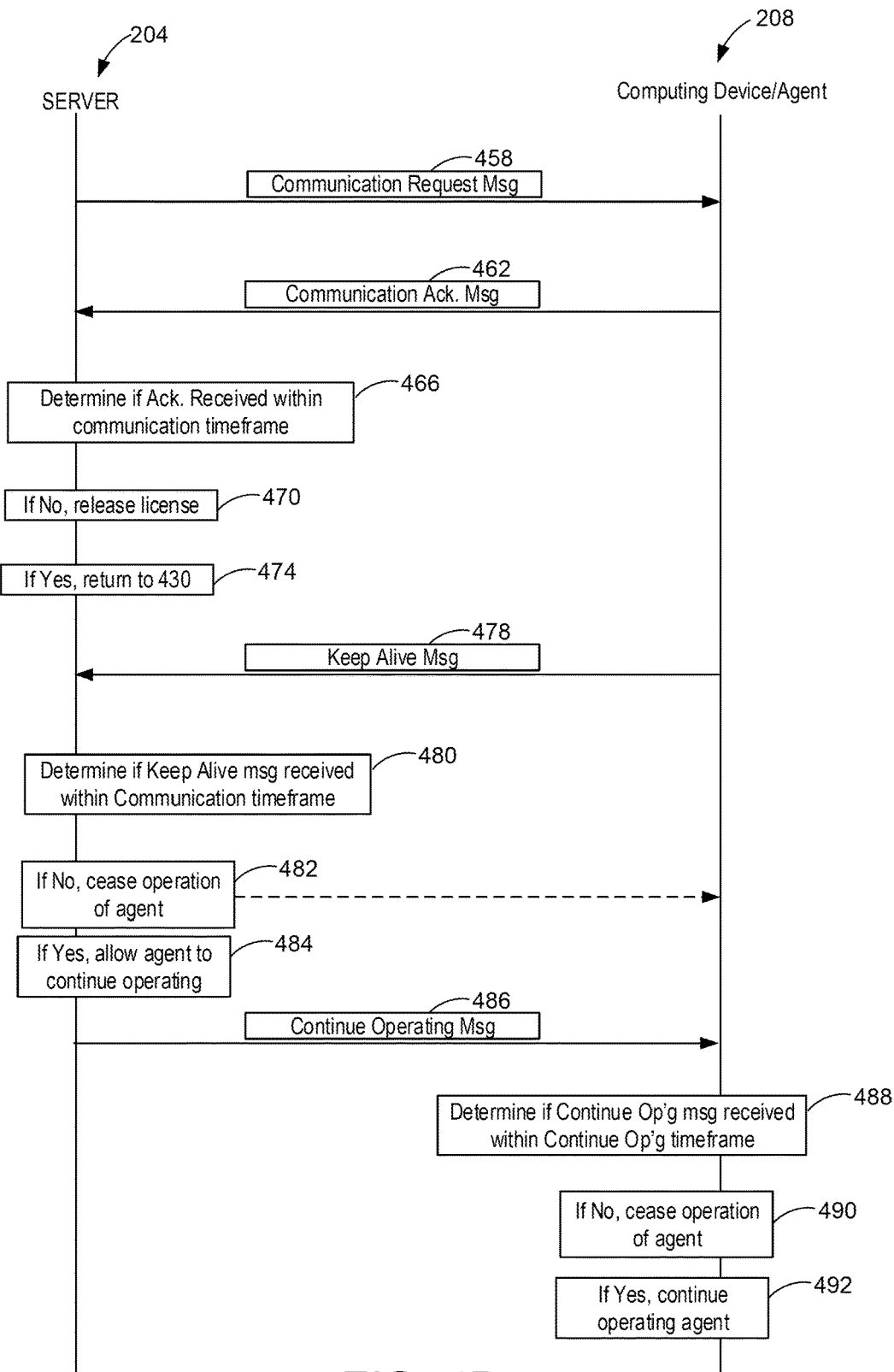

With reference now to FIG. 4B, in some examples when the agent 262 has completed the requested operation, the license server 204 may release the license that was being utilized by the agent to enable other agents to use the license. For example, a user may have purchased a license that authorizes the simultaneous use of 3 agents to run requested operations. When one agent has completed an operation, the agent may notify the license server of such completion, and the license for that agent may be released to enable another agent to use the license. For example, upon completion the agent may send an encrypted message to the license server indicating that the agent has completed the operation, whereupon the license server may release the license.

In some examples and due to network failure or other connectivity issue, an agent or computing device 208 may lose its communicative connection with the license server 204. In such a situation, when the agent completes the operation it is unable to notify the license server of such completion, and the license server may not release the license to the user for other uses. Accordingly and in one example, at 458 the license server 204 may send a periodic communication request message at a predetermined interval to the agent 262. In some examples, the predetermined interval may be every 30 seconds, 1 minute, 2 minutes, or any suitable timeframe. In response to receiving a communication request message and at 462, the agent 262 may reply by sending a communication acknowledgement message to the license server 204.

At 466 the license server may determine if an acknowledgement message was received from the agent within a communication timeframe, where the communication timeframe may be 5 seconds, 10 second, 30 seconds, 1 minute or any suitable timeframe after the communication request message was sent. If a communication acknowledgement message is not received within the communication timeframe, at 470 the license server 204 may release the license. If a communication acknowledgement message is received within the communication timeframe, at 474 the license server 204 may not release the license, and may send another communication request message at the next predetermined interval.

In some examples, a potential attacker may communicatively decouple the agent from the license server 204, which may cause the license server to release the license while the agent continues to run the licensed operation. To address this potential attack, in some examples at 478 the agent may periodically send a status message (or "keep alive" message) to the license server 204 to confirm that the agent remains communicatively coupled to the license server during performance of the operation. In some examples, such keep alive message may be encrypted using the shared symmetric key 218 or the public key 224.

At 480 the license server may determine if a keep alive message was received within a communication timeframe, where the communication timeframe may be 5 seconds, 10 second, 30 seconds, 1 minute or any suitable timeframe. If a keep alive message is not received within the communication timeframe, at 482 the license server 204 may cause the agent to cease operation. If the keep alive message is received within the communication timeframe, at 484 the license server 204 may allow the agent to continue operating under the license.

To provide an additional level of security, in some examples and for each keep alive message received within the communication timeframe, at 486 the license server 204 may send an acknowledgement message (or "continue operating" message) to the agent. At 488 the agent may determine if a continue operating message was received within an acknowledgement timeframe, where the acknowledgement timeframe may be 5 seconds, 10 second, 30 seconds, 1 minute or any suitable timeframe after the most recent keep alive message was sent. If a continue operating message is not received within the acknowledgement timeframe, at 490 the agent may cease operation. If a continue operating message is received within the acknowledgement timeframe, at 492 the agent may continue operating under the license. In this manner, both the license server 204 and the agent 262 may monitor their communications to identify and thwart potential attempts to circumvent the licensing protocols.

Figure 5:
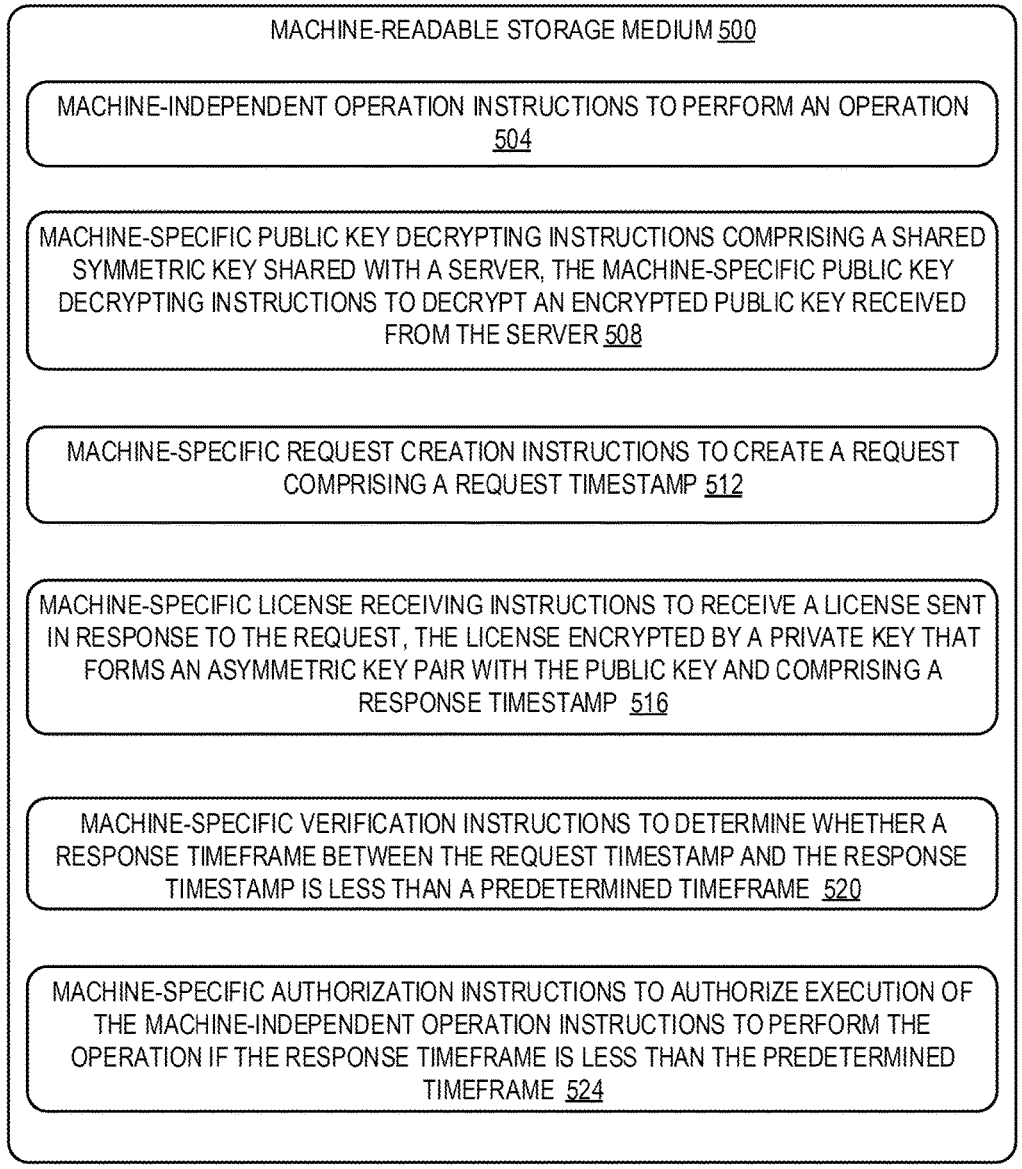
FIG. 5 is a block diagram of a non-transitory machine-readable storage medium containing instructions according to an example of the present disclosure.

With reference now to FIG. 5, a block diagram of a non-transitory machine-readable storage medium 500 containing instructions according to an example of the present disclosure is provided. In some examples and with reference also to FIG. 2, the non-transitory machine-readable storage medium may comprise application 250 and associated agents 262, 266 and 270, machine-independent operation instructions 254 and machine-specific encryption/decryption instructions 258. When executed by at least one processor, such as processor 244 of the computing device 208, such instructions may facilitate encrypted communications consistent with the following example and other examples described herein.

In the example of FIG. 5 and as described in more detail below, the instructions of non-transitory machine-readable storage medium 500 may include machine-independent operation instructions to, at 504, perform an operation. The instructions may include machine-specific public key decrypting instructions comprising a shared symmetric key shared with a server, the machine-specific public key decrypting instructions to, at 508, decrypt an encrypted public key received from a server, such as license server 204. The instructions may include machine-specific request creation instructions to, at 512, create a request comprising a request timestamp. The instructions may include machine-specific license receiving instructions to, at 516, receive a license sent in response to the request, the license encrypted by a private key that forms an asymmetric key pair with the public key and comprising a response timestamp. The instructions may include machine-specific verification instructions to, at 520, determine whether a response timeframe between the request timestamp and the response timestamp is less than a predetermined timeframe. The instructions may include machine-specific authorization instructions to, at 524, authorize execution of the machine-independent operation instructions to perform the operation if the response timeframe is less than the predetermined timeframe.

Turning now to FIGS. 6A and 6B, a block diagram of a non-transitory machine-readable storage medium 600 containing instructions according to another example of the present disclosure is provided. In some examples and with reference also to FIG. 2, the non-transitory machine-readable storage medium 600 may comprise application 250 and associated agents 262, 266 and 270, machine-independent operation instructions 254 and machine-specific encryption/decryption instructions 258. When executed by at least one processor, such as processor 244 of the computing device 208, such instructions may facilitate encrypted communications consistent with the following example and other examples described herein.

In the example of FIGS. 6A and 6B, the instructions of non-transitory machine-readable storage medium 600 may include at 604 machine-independent operation instructions written in a scripting programming language. At 608 the instructions may include machine-specific public key decrypting instructions comprising a shared symmetric key shared with a server, the machine-specific public key decrypting instructions to decrypt an encrypted public key received from the server. At 612 the instructions may include machine-specific request creation instructions to create a request comprising a request timestamp. At 616 the request may comprise a request timestamp. At 620 the instructions may include machine-specific license receiving instructions to receive a license sent in response to the request, the license encrypted by a private key that forms an asymmetric key pair with the public key and comprising a response timestamp.

At 624 the instructions may include machine-specific verification instructions to determine whether a response timeframe between the request timestamp and the response timestamp is less than a predetermined timeframe. At 628 the instructions may include machine-specific authorization instructions to authorize execution of the machine-independent operation instructions to perform the operation if the response timeframe is less than the predetermined timeframe. With reference now to FIG. 6B, at 632 the instructions may include machine-specific notification instructions to send to the server a message confirming completion of the operation when the machine-independent operation instructions complete performance of the operation. At 636 the instructions may include machine-specific status confirmation instructions to send a status message encrypted by the public key to the server during performance of the operation; and if an acknowledgement message responsive to the encrypted status message is not received from the server within an acknowledgement timeframe, to cease performance of the operation.

At 640 the instructions may include, where the request comprises a request identification, machine-specific request storage instructions to store the request identification in a storage. At 644 the instructions may include machine-specific identification instructions to compare a license request identification in the license received from the server to the stored request identification; and if the license request identification does not match the stored request identification, prevent performance of the operation.

Figure 7:
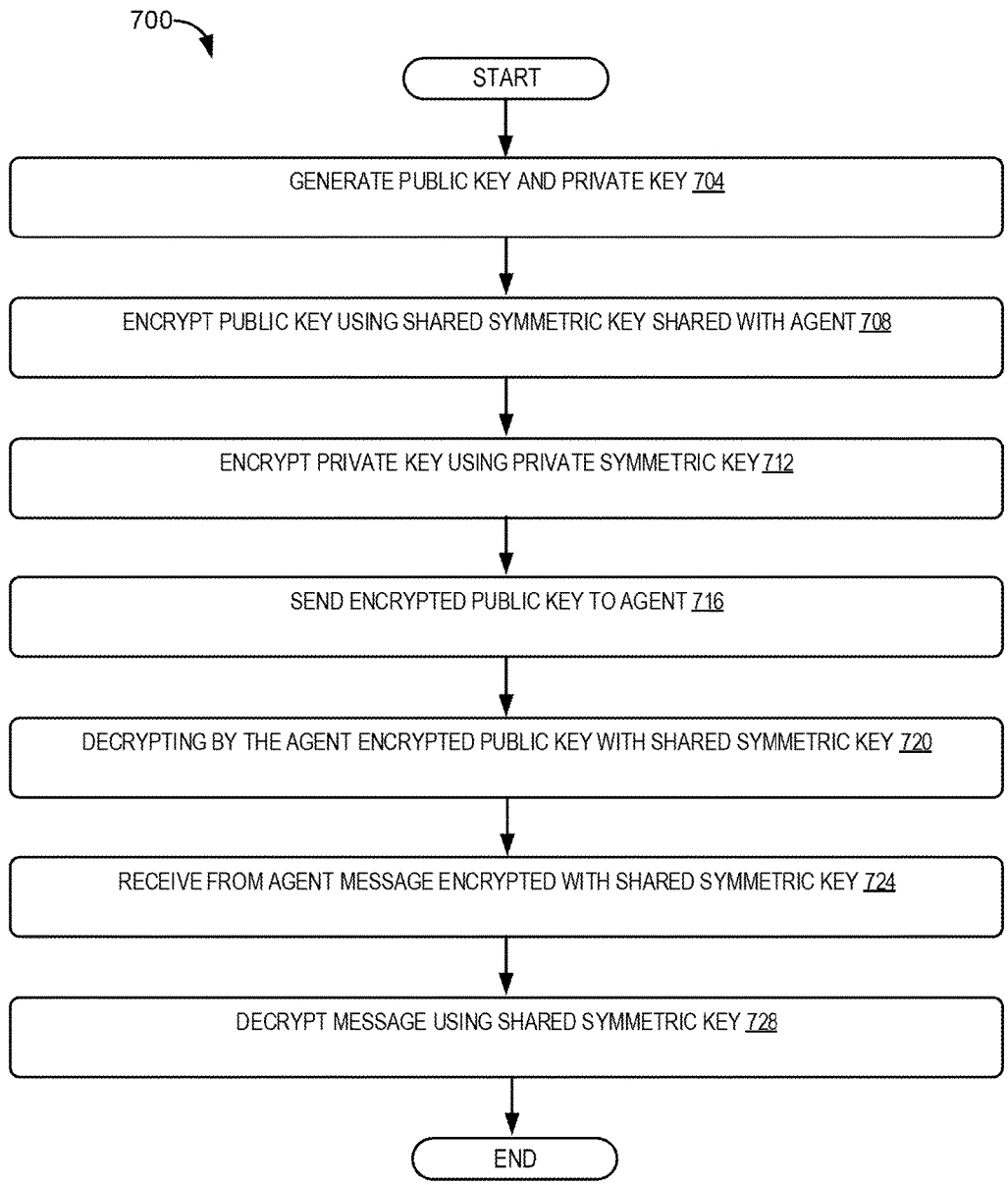
FIG. 7 is a flow chart of a method for encrypting a message according to an example of the present disclosure.

With reference now to FIG. 7, a flow chart of a method 700 for encrypting a message according to another example of the present disclosure is provided. The flow chart of FIG. 7 illustrates an example method that may provide encrypted communication in a manner similar to the flows shown in FIGS. 3, 4A and 4B described above. The following description of method 700 is provided with reference to the software and hardware components described above and shown in FIGS. 1-6. The method 700 may be executed in the form of instructions encoded on a non-transitory machine-readable storage medium that is executable by a processor. It will be appreciated that method 700 may also be performed in other contexts using other suitable hardware and software components.

With reference to FIG. 7, at 704 the method 700 may include generating a public key and a private key. At 708 the method 700 may include encrypting the public key using a shared symmetric key shared with an agent. At 712 the method 700 may include encrypting the private key using a private symmetric key. At 716 the method 700 may include sending the encrypted public key to the agent. At 720 the method 700 may include decrypting, by the agent, the encrypted public key with the shared symmetric key. At 724 the method 700 may include receiving, from the agent, the message encrypted with the shared symmetric key. At 728 the method 700 may include decrypting the message using the shared symmetric key.

Method 700 is provided by way of example and is not meant to be limiting. Method 700 may include additional and/or other elements than those illustrated in FIG. 7. Further, method 700 may be performed in any suitable order. Further still, at least one element may be omitted from method 700 without departing from the scope of this disclosure.

Figure 8:
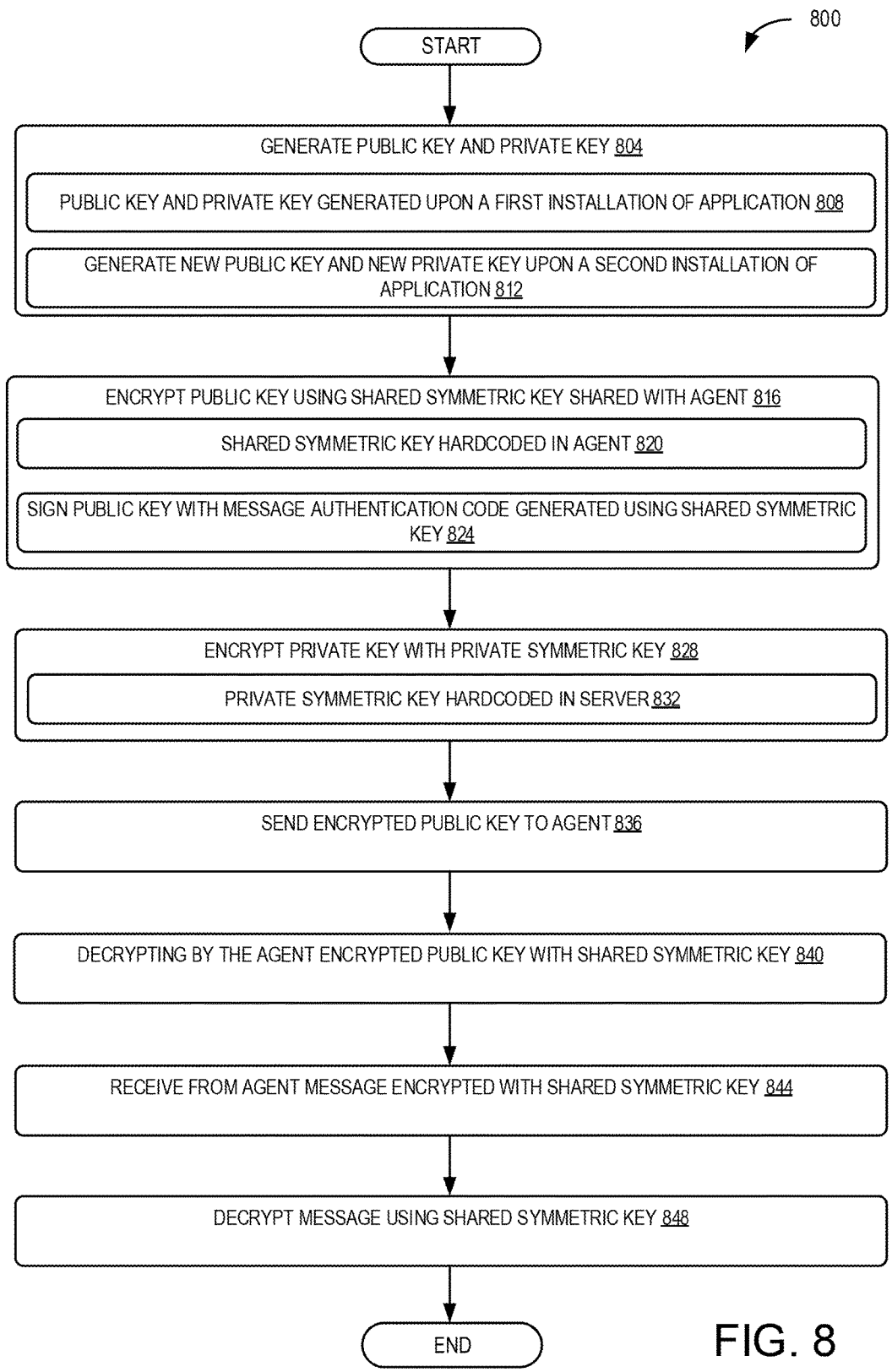
FIG. 8 is a flow chart of a method for encrypting a message according to another example of the present disclosure

With reference now to FIG. 8, a flow chart of a method 800 for encrypting a message according to another example of the present disclosure is provided. The flow chart of FIG. 8 illustrates another example method that may provide encrypted communication in a manner similar to the flows shown in FIGS. 3, 4A and 4B described above. The following description of method 800 is provided with reference to the software and hardware components described above and shown in FIGS. 1-6. The method 800 may be executed in the form of instructions encoded on a non-transitory machine-readable storage medium that is executable by a processor. It will be appreciated that method 800 may also be performed in other contexts using other suitable hardware and software components.

With reference to FIG. 8, at 804 the method 800 may include generating a public key and a private key. At 808 the public key and the private key may be generated upon a first installation of an application. At 812 the method 800 may include generating a new public key and a new private key upon a second installation of the application. At 816 the method 800 may include encrypting the public key using a shared symmetric key shared with an agent. At 820 the shared symmetric key may be hardcoded in the agent. At 824 method 800 may include signing the public key with a message authentication code generated using the shared symmetric key. At 828 the method may include encrypting the private key using a private symmetric key. At 832 the private symmetric key may be hardcoded in the server.

At 836 the method 800 may include sending the encrypted public key to the agent. At 840 the method 800 may include decrypting, by the agent, the encrypted public key with the shared symmetric key. At 844 the method 800 may include receiving, from the agent, the message encrypted with the shared symmetric key. At 848 the method 800 may include decrypting the message using the shared symmetric key.

The invention claimed is:

1. A method of a system comprising a processor, comprising:
   encrypting a public key using a shared symmetric key shared with an agent, to form an encrypted public key;
   encrypting a private key using a private symmetric key to form an encrypted private key;
   sending the encrypted public key to the agent over a network;
   receiving, from the agent over the network, a first message encrypted with the shared symmetric key, the first message comprising a request to run an operation at a computing device using the agent;
   decrypting the first message using the shared symmetric key; and
   sending an encrypted second message to the agent over the network, the encrypted second message encrypted with the private key produced by decrypting the encrypted private key, the encrypted second message authorizing the operation at the computing device.

2. The method of claim 1, wherein the private symmetric key is hardcoded in a server that receives the first message and sends the encrypted second message.

3. The method of claim 1, wherein the shared symmetric key is hardcoded in the agent.

4. The method of claim 1, comprising signing, by the system, the public key with a message authentication code generated using the shared symmetric key.

5. The method of claim 1, further comprising generating the public key and the private key in response to a first installation of an application, the method further comprising:
   generating a new public key and a new private key in response to a second installation of the application.

6. The method of claim 1, wherein the authorizing of the operation at the computing device is in response to decryption of the encrypted second message using the public key produced by the agent by decrypting the encrypted public key received by the agent from the system over the network.

7. The method of claim 1, wherein the encrypted second message includes a license that enables a functionality of an application at the computing device.

8. The method of claim 1, further comprising:
   sending, by the system over the network to the agent, a communication request message;
   receiving, by the system over the network from the agent, an acknowledgment of the communication request message;
   in response to determining that the acknowledgment was not received within a specified time duration of the communication request message, releasing, by the system, the license.

9. The method of claim 1, wherein the public key and the private key are part of an asymmetric key pair.

10. A server, comprising:
    a processor;
    a non-transitory storage medium storing instructions executable on the processor to:
      generate an asymmetric key pair;
      encrypt a private key of the asymmetric key pair using a hardcoded private symmetric key;
      encrypt a public key of the asymmetric key pair using a shared symmetric key;
      send the encrypted public key over a network to a computing device that comprises the shared symmetric key hardcoded on the computing device;
      receive, from the computing device over the network, a first message encrypted with the shared symmetric key, the first message comprising a request to run an operation at the computing device;
      decrypt the first message using the shared symmetric key; and
      send an encrypted second message to the computing device over the network, the encrypted second message encrypted with the private key produced by decrypting the encrypted private key with the hardcoded private symmetric key, the encrypted second message authorizing the operation at the computing device.

11. The server of claim 10, wherein the first message comprises a request timestamp indicating when the first message was created, and the instructions are executable on the processor to:
    in response to determining that the first message is valid, send to the computing device the second message that includes a response timestamp.

12. The server of claim 10, wherein the instructions are executable on the processor to sign the encrypted public key with a message authentication code generated using the shared symmetric key.

13. The server of claim 10, wherein the asymmetric key pair is a first asymmetric key pair that is generated upon a first installation of an application, wherein the instructions are executable on the processor to generate a new asymmetric key pair upon a second installation of the application.

14. The server of claim 10, wherein the instructions are executable on the processor to:
    send a communication request message to the computing device; and
    if a communication acknowledgement message responsive to the communication request message is not received from the computing device within a communication timeframe, release a license under which the computing device is operating.

15. The server of claim 10, wherein the encrypted second message includes a license that enables a functionality of an application at the computing device.

16. The server of claim 10, wherein the instructions are executable on the processor to:
    send, over the network to the computing device, a communication request message;
    receive, over the network from the computing device, an acknowledgment of the communication request message;

in response to determining that the acknowledgment was not received within a specified time duration of the communication request message, release the license.

* * * * *